US009494429B2

(12) United States Patent
Drange et al.

(10) Patent No.: US 9,494,429 B2
(45) Date of Patent: Nov. 15, 2016

(54) MARINE STREAMER INERTIAL NAVIGATING DRAG BODY

(71) Applicant: PGS Geophysical AS, Oslo (NO)

(72) Inventors: Geir Andre Motzfeldt Drange, Borgen (NO); Torbjørn Ursin, Oslo (NO)

(73) Assignee: PGS Geophysical AS, Oslo (NO)

( * ) Notice: Subject to any disclaimer, the term of this patent is extended or adjusted under 35 U.S.C. 154(b) by 490 days.

(21) Appl. No.: 14/183,615

(22) Filed: Feb. 19, 2014

(65) Prior Publication Data

US 2015/0117148 A1    Apr. 30, 2015

Related U.S. Application Data

(60) Provisional application No. 61/897,544, filed on Oct. 30, 2013.

(51) Int. Cl.
*G01V 1/06* (2006.01)
*G01C 13/00* (2006.01)
*G01C 21/16* (2006.01)

(52) U.S. Cl.
CPC ............. *G01C 21/165* (2013.01); *G01C 13/00* (2013.01); *G01C 21/16* (2013.01)

(58) Field of Classification Search
USPC ........................................................ 367/19
See application file for complete search history.

(56) References Cited

U.S. PATENT DOCUMENTS

| 4,870,626 | A | 9/1989 | Tveit |
| 5,546,882 | A | 8/1996 | Kuche |
| 7,835,221 | B2 | 11/2010 | Vigen et al. |
| 8,477,560 | B2 | 7/2013 | Welker |
| 8,483,008 | B2* | 7/2013 | Welker .................... B63B 21/66 367/17 |
| 8,573,050 | B2 | 11/2013 | Sudow et al. |
| 2003/0026499 | A1 | 2/2003 | Stewart et al. |
| 2008/0008031 | A1 | 1/2008 | Vigen et al. |
| 2008/0008037 | A1 | 1/2008 | Welker |
| 2008/0253225 | A1* | 10/2008 | Welker ..................... G01V 1/20 367/17 |
| 2009/0092005 | A1 | 4/2009 | Goujon et al. |
| 2009/0141587 | A1 | 6/2009 | Welker |

(Continued)

FOREIGN PATENT DOCUMENTS

| EP | 1340999 A1 | 9/2003 |
| GB | 2499397 | 8/2013 |

OTHER PUBLICATIONS

James Brady et al., "Electromagnetic Sounding for Hydrocarbons", Oilfield Review, Spring 2009, 21, No. 1, pp. 4-19.

(Continued)

*Primary Examiner* — James Hulka (57) ABSTRACT

A sensor streamer drag body system. At least some of the example embodiments include a system having a sensor streamer towable behind a vessel in a body of water, the sensor streamer defining a defining a distal end and a proximal end, the proximal end nearest the vessel. The system further includes a drag body coupled to the distal end of the sensor streamer, wherein the drag body remains submerged while the sensor streamer is deployed. The drag body includes an inertial navigation system. The inertial navigation system is configured to determine a position of the drag body, the drag body lacking an internal GPS.

22 Claims, 8 Drawing Sheets

(56) References Cited

U.S. PATENT DOCUMENTS

| | | |
|---|---|---|
| 2009/0316525 A1 | 12/2009 | Welker |
| 2010/0002076 A1 | 1/2010 | Welker et al. |
| 2010/0002538 A1 | 1/2010 | Frivik et al. |
| 2010/0074050 A1 | 3/2010 | Welker |
| 2010/0097208 A1* | 4/2010 | Rosing ............... G06Q 10/087 340/539.13 |
| 2010/0118645 A1* | 5/2010 | Welker ............... B63B 21/66 367/17 |
| 2010/0202249 A1 | 8/2010 | Goujon et al. |
| 2010/0226204 A1 | 9/2010 | Gagliardi et al. |
| 2010/0278011 A1 | 11/2010 | Harrick |
| 2011/0110187 A1 | 5/2011 | Harrick et al. |
| 2011/0175604 A1* | 7/2011 | Polzer ............... G01R 33/022 324/246 |
| 2011/0182138 A1 | 7/2011 | Sudow et al. |
| 2011/0279120 A1* | 11/2011 | Sudow ............... G01V 1/3835 324/334 |
| 2011/0300939 A1 | 12/2011 | Mao et al. |
| 2011/0317514 A1 | 12/2011 | Sudow et al. |
| 2012/0134234 A1 | 5/2012 | Phillip et al. |
| 2012/0230150 A1 | 9/2012 | Sudow et al. |
| 2013/0010570 A1 | 1/2013 | Sudow et al. |
| 2013/0010571 A1 | 1/2013 | Sudow et al. |
| 2013/0033960 A1 | 2/2013 | Mckey, III |
| 2013/0201316 A1* | 8/2013 | Binder ............... H04L 67/12 348/77 |
| 2013/0286772 A1 | 10/2013 | Sudow |
| 2015/0117716 A1* | 4/2015 | Ursin ............... G06K 9/6215 382/106 |

OTHER PUBLICATIONS

Staff Report, "2014 Meritorious Awards for Engineering Innovation", www.epmag.com/item/print/2014-Meritorious-Awards-Engineering-Innovation-132699, Aug. 26, 2014, see p. 8, 12 pages total.

Honeywell model HG9900 product description, Phoenix, AZ, Sep. 2009.

European Search Report dated Aug. 28, 2015, Application No. 14189724.9.

European Search Report for Patent Application No. 16167208.4-1559, mailed on Aug. 29, 2016.

* cited by examiner

MARINE STREAMER INERTIAL NAVIGATING DRAG BODY

CROSS-REFERENCE TO RELATED APPLICATIONS

This disclosure claims the benefit of U.S. Provisional Application Ser. No. 61/897,544 filed Oct. 30, 2013 titled "Marine Streamer Inertial Navigating Drag Body", which provisional application is incorporated by reference herein as if reproduced in full below.

BACKGROUND

Geophysical surveying (e.g., seismic, electromagnetic) is a technique where two- or three-dimensional "pictures" of the state of an underground formation are taken. Geophysical surveying takes place not only on land, but also in marine environments (e.g., oceans, large lakes). Marine geophysical surveying systems frequently use a plurality of sensor streamers (long cables), which contain one or more sensors to detect energy emitted by one or more sources and subjected to interaction with underground formations below the water bottom. Deployment of sensor streamers and sources often utilizes additional equipment, such as paravanes, lead cables, lateral or depth control devices, and buoys to properly align and maintain the sensor streamers and sources.

Sensor streamers such as those employed in marine geophysical surveying may be more than 10 kilometers in length. A plurality of such sensor streamers that are spaced apart may be towed in a body of water behind a vessel. During the operation, it may be advantageous to know and maintain the position of the sensor streamers in the body of water to improve data quality. Entanglement of the streamers may be avoidable when the position of sensor streamers in the body of water is known and maintained.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

Survey equipment" shall mean equipment deployed or towed in a body of water during a geophysical survey (e.g., seismic, electromagnetic) of underground formations.

"Operationally deployed", in reference to a sensor streamer or drag body coupled to a sensor streamer, shall mean that the sensor streamer is at an operational depth for a particular marine geophysical survey.

"Leading end" of a device shall mean a leading portion of the device when the device is towed through water during normal operationsMor, but shall not be read to require the device to be towed. That is, a leading end shall still be considered the leading end when the device is stationary.

"Global positioning system" or "GPS" shall mean a system which receives signals from a constellation of satellites orbiting the earth, and which determines a location based on receipt of the signals from the satellites.

"Operational buoyancy" shall refer to the buoyancy of a drag body while coupled to a sensor streamer in normal operation. The presence or use of an emergency buoyancy system that activates to prevent loss the drag body (e.g., to prevent loss if the sensor streamer is severed) shall not be considered to affect "operational buoyancy."

"Constant", in reference to operational buoyancy of a drag body, shall mean that the buoyancy of the drag body is not changed by virtue of operation of controllable means associated with the drag body, such as ballast weights, ballast chambers, and the like. Buoyancy changes of a drag body caused by changes in depth, water temperature, and/or water salinity shall not obviate the status of operational buoyancy as "constant." Moreover, "constant" is not intended to imply absolute constancy but is intended to mean unchanged within the normal range of variability of operational parameters.

"Inertial measurement unit" shall mean an electronic device that measures at least acceleration and orientation. An inertial measurement unit may be combined with a computer system to create an inertial navigation system to calculate position by way of dead reckoning.

"Relative positioning unit" shall mean a system that provides an indication of distance to or from an object. The fact that an absolute position may be calculable using the indication of distance if the absolute position of the object is known shall not obviate the status of a system as a "relative positioning unit."

"Fully submerged" shall mean a device is at, as measured from a point on the device nearest the surface, one-fourth of a vertical height of the device beneath the surface of a body of water as the surface is defined in the absence of wave motion. As used herein, a device shall be fully submerged in the presence of wave motion if excursions of the device in the water transiently reduce its depth to less than the foregoing amount.

"Correct" and "correcting", in relation to a calculated position of an inertial navigation system, shall mean reducing positional drift using data derived from a source other than an inertial measurement unit. Determining a new or next calculated position using data from an inertial measurement unit shall not be considered to taking action to "correct" or "correcting" of positional drift.

"Exemplary," as used herein, means serving as an example, instance, or illustration." An embodiment described herein as "exemplary" is not necessarily to be construed as preferred or advantageous over other embodiments.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must).

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

Various embodiments are directed to a drag body to be used in conjunction with a marine geophysical surveying system. More particularly, various embodiments are directed to drag body devices coupled to the ends furthest from the survey vessel 102 (i.e. the distal ends) of respective sensor streamers, where the drag body devices include an inertial navigation system used to determine position of the drag body, and thus position of the distal end of the sensor streamer. More particularly still, various embodiments are directed to a drag body with an internally disposed inertial navigation system such that position of the drag body, and thus the position of the distal end of the sensor streamer, can be determined in spite of the drag body remaining submerged for extended periods of time. The specification first turns to a description of an example marine surveying system.

Figure 1:
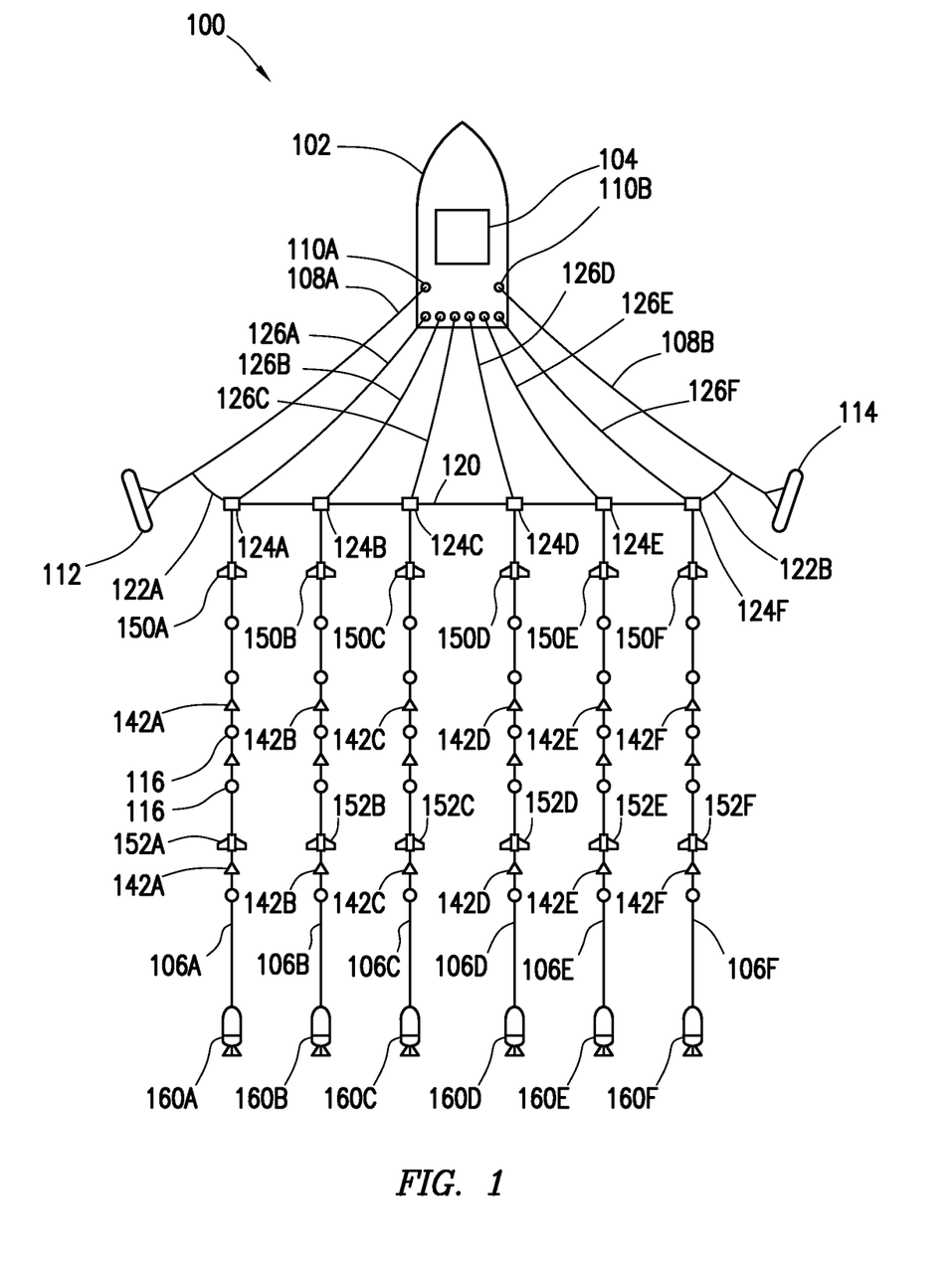
FIG. 1 shows an overhead view of a marine survey system in accordance with at least some embodiments.

FIG. 1 shows an overhead view of a marine survey system 100 in accordance with at least some embodiments. In particular, FIG. 1 shows a survey vessel 102 having onboard equipment 104, such as navigation, energy source control, and data recording equipment. Survey vessel 102 is configured to tow one or more sensor streamers 106A-F through the water. While FIG. 1 illustratively shows six sensor streamers 106, any number of sensor streamers 106 may be used. In at least some embodiments, for example in a two-dimensional (2D) survey, a single streamer may be used.

The sensor streamers 106 each comprise a plurality of sensors 116. The type of sensors 116 associated with each sensor streamer 106 depends on the survey type. For example, for marine seismic surveys, each sensor 116 may be a hydrophone, a geophone, or a hydrophone and geophone pair. In another example for marine electromagnetic surveys, each sensor 116 may be an electric field detector, a magnetic field detector, or a combination electric and magnetic field detector. Likewise, a combination of seismic and electromagnetic sensors may be utilized on one or more of the sensor streamers 106. The type of sensor is independent of the design and use of drag bodies in accordance with the example embodiments. As would be understood by one of ordinary skill in the art with the benefit of this disclosure, geophysical surveys that utilize deep-towed streamers may especially benefit from drag bodies as herein disclosed.

The sensor streamers 106 are coupled to survey equipment that maintains the sensor streamers 106 at selected lateral positions with respect to each other and with respect to the survey vessel 102. For example, the survey equipment may comprise two paravane tow lines 108A and 108B each coupled to the vessel 102 by way of winches 110A and 110B, respectively. The winches enable changing the deployed length of each paravane tow line 108. The second end of paravane tow line 108A may be coupled to a paravane 112, and the second end of paravane tow line 108B may be coupled to paravane 114. In each case, the tow lines 108A and 108B may couple to their respective paravanes through respective sets of lines called a "bridle". The paravanes 112 and 114 are typically configured to provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension. The paravanes 112 and 114 either may couple directly to the spreader line 120 or as illustrated may couple to the spreader line by way of spur lines 122A and 122B.

The sensor streamers 106 each may be each coupled, at the ends nearest the survey vessel 102 (i.e., the proximal ends) to a respective lead-in cable termination 124A-F. The lead-in cable terminations 124 may be coupled to or associated with the spreader lines 120 so as to better control the lateral positions of the sensor streamers 106 with respect to each other and with respect to the survey vessel 102. Electrical and/or optical connections between the appropriate components in the onboard equipment 104 and the sensors (e.g., 116 in the streamers 106 may be made using lead-in cables 126A-F. Likewise, lead-in cables 126A-F may also provide electrical and/or optical connections to the devices coupled to or within the sensor streamers (such as the acoustic positioning units 142A-F discussed more below, and the drag body devices 160A-F also discussed more below). Much like the tow lines 108 associated with respective winches 110, each of the lead-in cables 126 may be deployed by a respective winch or similar spooling device such that the operationally deployed length of each lead-in cable 126 can be changed.

Each sensor streamer 106 may include acoustic positioning units 142. In particular, each sensor streamer 106A-F may include a respective array of acoustic positioning units 142A-F, disposed at locations along a length of the sensor streamer. Acoustic positioning units 142 may comprise an acoustic transducer for communicating via acoustic waves transmitted through the water. Communications may be between sensor streamers, between a sensor streamer and the survey vessel, and as described further below, between the drag bodies and sensor streamers, and such communications may be used to provide data indicative of the relative positions of the acoustic positioning units. For example, a drag body communicating with an acoustic positioning unit at a particular location on a sensor streamer may determine data indicative of a relative position of the drag body and the location of the acoustic positioning unit on the sensor streamer. In at least some other embodiments, optical positioning units may be used to provide the relative positioning function provided by the acoustic positioning units in the illustrative embodiment. Such optical positioning units may employ electromagnetic radiation at optical wavelengths suitable for transmission through sea water rather than acoustic signals, but the communications principles with respect to the exchange of data are otherwise the same.

Still referring to FIG. 1, in many cases the sensor streamers 106 will be associated with a plurality of streamer positioning devices. For example, the sensor streamers 106A-F may be associated with streamer positioning devices 150A-F, respectively, shown coupled on the proximal end of the sensor streamers. In many cases, the streamer positioning devices 150A-F may provide only depth control, as the lateral spacing of the sensor streamers near the proximal ends may be adequately controlled by the spreader cable 120, and twisting (i.e., rotation about the long axis of the sensor streamer) may not be an issue close to the lead-in cable terminations 124A-F. Further, the sensor streamers 106A-F may be associated with streamer positioning devices 152A-F, respectively, shown coupled further from the proximal ends of the sensor streamers 106A-F. The streamer positioning devices 152A-F may provide not only depth control, but also lateral positional control and may assist in preventing twisting experienced by the sensor streamers. In some cases each sensor streamer 106 may be 1000 to 10000 meters in length, and may comprise 20 or more streamer positioning devices.

In example embodiments, one or more sensor streamer 106A-F may be associated with a respective drag body 160A-F. Each drag body 160A-F may mechanically couple to the distal end of its respective sensor streamer 106A-F, and may provide mechanical drag in the water to aid in keeping the sensor streamers in proper physical orientation. Moreover, in the various embodiments each drag body may include an inertial navigation system (discussed in greater detail below) such that the each drag body can determine its position. In some embodiments each drag body 160 may be communicatively coupled to the onboard equipment 104 of the survey vessel 102, and thus may be indirectly communicatively coupled to other drag bodies 160. Before delving into the specifics of the inertial navigation system associated with each drag body, the specification first turns to a discussion of a related-art system in order to draw distinctions between use of drag bodies and use of tail buoys.

Figure 2:
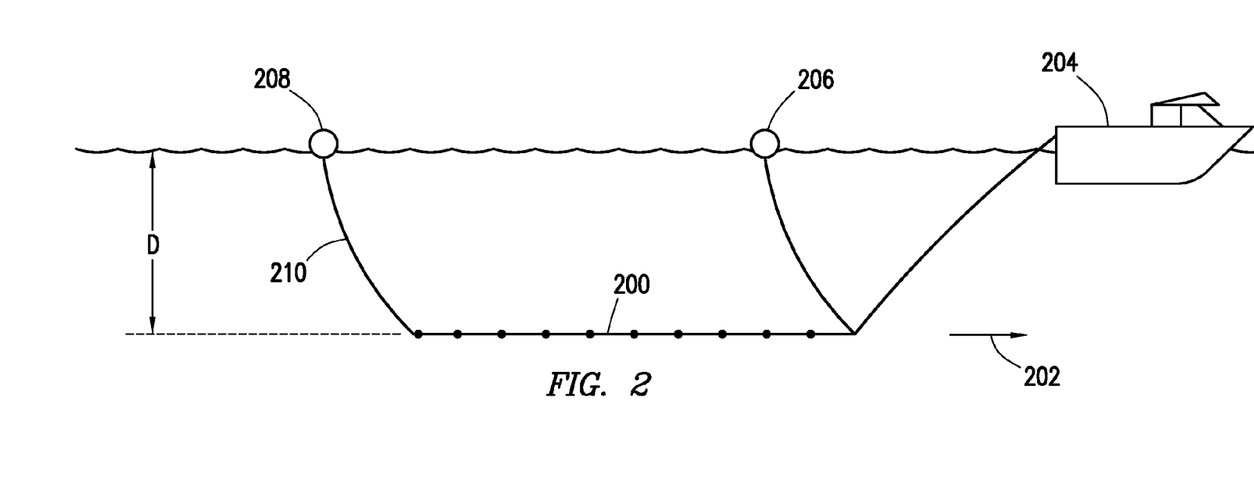
FIG. 2 shows a side elevation view of a sensor streamer illustrating the use of tail buoys in the related art.

FIG. 2 shows a side elevation view of a sensor streamer 200 to further describe use of tail buoys in the related-art. While only one sensor streamer 200 is visible in FIG. 2, it will be understood that many such sensor streamers 200 may be present at similar depths but at different horizontal positions. In particular, FIG. 2 shows a sensor streamer 200 being towed in a direction indicated by arrow 202 by survey vessel 204. In some embodiments, the forward portion of the sensor streamer may be associated with a lead buoy 206, where lead buoy 206 may help maintain the depth of the sensor streamer 200 and/or associated portion of the spreader line; however, in other cases the lead buoy 206 may be omitted, or other buoys (e.g., buoys associated with the spreader line (not shown in FIG. 2)) may perform similar functions. FIG. 2 also illustrates related-art use of a tail buoy 208. Tail buoy 208 may couple to the distal end of the sensor streamer 200 by any suitable mechanism, such as line 210, sometimes referred as a "dead section". In some cases, tail buoy 208 may ride along the surface of the water during the marine geophysical survey and at least partially support the sensor streamer 200 at the selected depth D below the surface of the water. Between the proximal end of the sensor streamer 200 and the distal end of the sensor streamer 200, the streamer positioning devices (not specifically shown) may help with localized depth control of the sensor streamer.

Sensor streamers have a tendency to cross and tangle, which may cause sensor streamers having tail buoys (such as tail buoy 208 of FIG. 2) to tangle with other tail buoys. Entanglement of tail buoys may also occur during deployment or retrieval of sensor streamers 200. Furthermore, the tail buoy 208, and particularly the line 210, may entangle with obstacles, such as debris, fishing gear, offshore structures, and ice floes. Tail buoys that are entangled may require manual untangling, which is time consuming and costly. Unless a nearby repair vessel has the capability and availability to untangle the tail buoys, the survey operation may be suspended so that the survey crew may manually untangle tail buoys. Moreover, tail buoys may impart unwanted motion and/or mechanical noise in rough seas, which mechanical noise may translate into unwanted noise in the recorded signals in seismic surveys.

In other related-art systems, tail buoys may be configured to be controllable. For example, a tail buoy may be configured to be submerged on command from the survey vessel. However, in the related-art systems where tail buoys submerge on command the tail buoys may periodically surface in order for telemetry hardware in the tail buoy to acquire position data. For example, where the telemetry hardware of a tail buoy includes Global Positioning System devices, the tail buoy may periodically surface in order to receive satellites signals to determine position. The requirement of periodically surfacing to establish position may require the geophysical survey to cease, thus increasing the time and cost. Moreover, in related-art systems the tail buoys typically utilize a complex design with many moving parts in order to selectively submerge and surface. In some cases, such as marine geophysical surveys using deep tow sensor streamers (e.g., electromagnetic surveys) the depth of the sensor streamer may hinder use of tail buoys.

Figure 3:
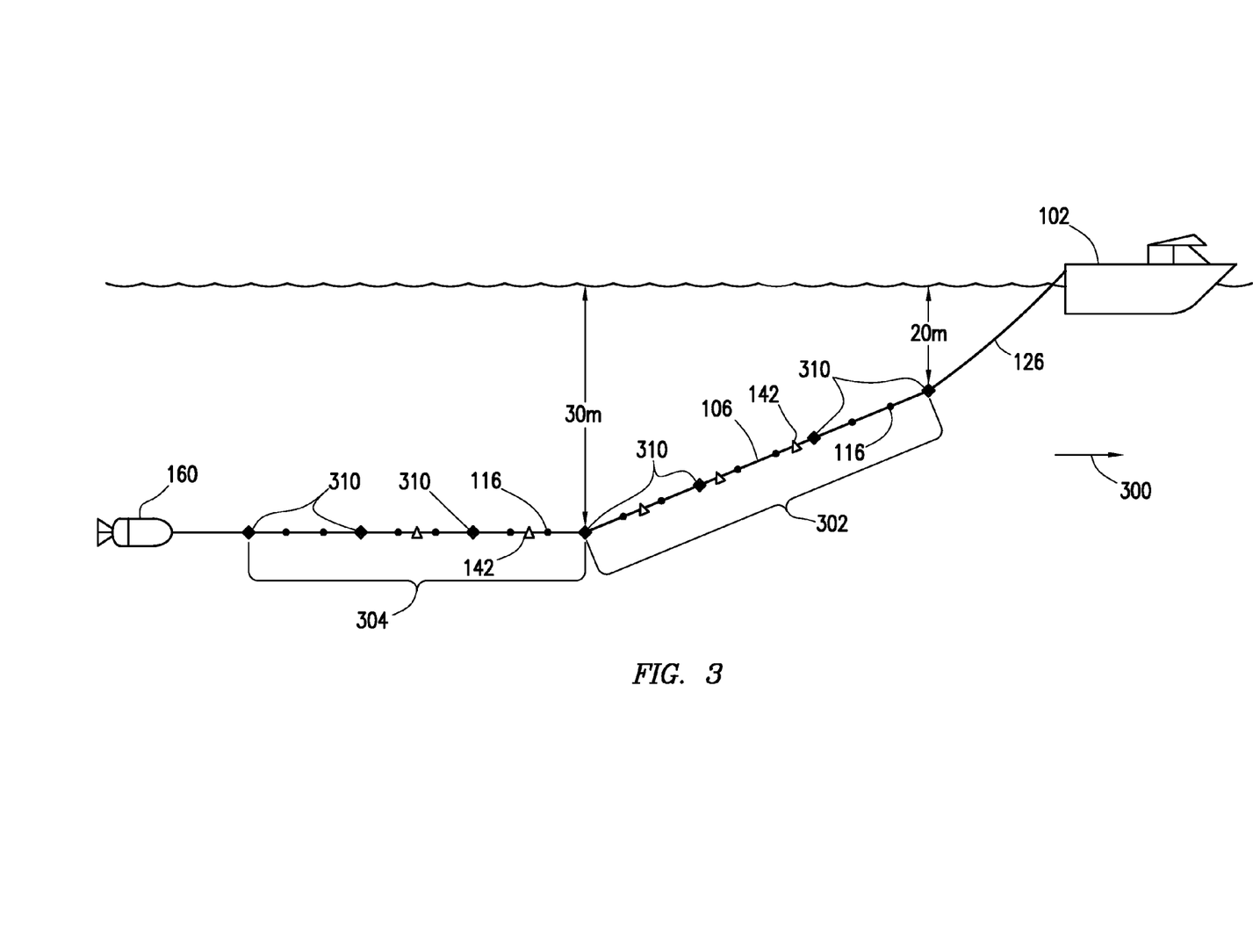
FIG. 3 shows a side elevation view of a sensor streamer in accordance with at least some embodiments.

FIG. 3 shows a side elevation view of a sensor streamer 106 utilizing drag body 160 in accordance with example embodiments including some deep tow example embodiments. While only one sensor streamer 106 is visible in FIG. 3, it will be understood that many such sensor streamers 106 may be present at similar depths but at different horizontal positions, and thus the further sensor streamers are not visible in FIG. 3. In particular, in FIG. 3 shows a sensor streamer 106 being towed in a direction indicated by arrow 300 by survey vessel 102, and sensor streamer comprises a first section 302 and second section 304. The sensor streamer 106 may comprise a plurality of sensors 116, a plurality of streamer positioning devices 310 (which may have the same characteristics and functionality as streamer positioning devices 150 and 152 of FIG. 1), and one or more acoustic positioning units 142.

In accordance with various embodiments, the localized depth of the sensor streamer may be controlled, at least in part, by respective streamer positioning devices 310. In one illustrative deep tow system as in FIG. 3 the depth of the first section 302 of the sensor streamer may change linearly downward from a most shallow point to a most deep point. As illustrated, the depth of first section 302 may change essentially linearly (with expected fluctuations from currents and drag) from the most shallow point to the most deep point. In other embodiments, the depth of first section 302 may likewise change parabolically, hyperbolically, or catenoidally. In still other embodiments, the most shallow point of first section 302 may not be at the most proximal point, and/or the most deep point may not be at the most distal point. The depth of second section 304 may be constant and at least as deep as the most deep point of section 302. The depth profile of the first section 302 may be controlled, at least in part, by supplying setpoint depths to the streamer positioning devices 310 within the second section 302, where the setpoint depths may define the example profile. The depth profile of the second section 304 may be controlled by supplying setpoint depths to the streamer positioning devices 310 associated with the second section 304. In some embodiments, section 302 may be 3,000 meters in length, and section 304 may be 4,000 meters in length, but different sensor streamer lengths may be used in various embodiments. Moreover in the example system, the shallowest point may be about 20 meters, and the depth may change linearly in this example to deepest tow depth of about 30 meters, but other depths may be used.

Still referring to FIG. 3, in one example deep tow system, the sensor streamer 106 may couple at its distal end to a drag body 160. As the name somewhat implies, drag body 160 may provide a predetermined amount of drag at the distal end of the sensor streamer 106. The drag may help keep the sensor streamer in a proper orientation relative to the survey vessel 102 and or other sensor streamers (not visible in FIG. 3). As shown, however, the drag body 160 is not a tail buoy, and does not ride along the surface of the water during the marine geophysical survey, thus eliminating the mechanical noise imparted to sensor streamer 106 and the chance of entanglement with other survey equipment. The discussion now turns to an explanation of an example drag body 160 in greater detail.

Figure 4A:
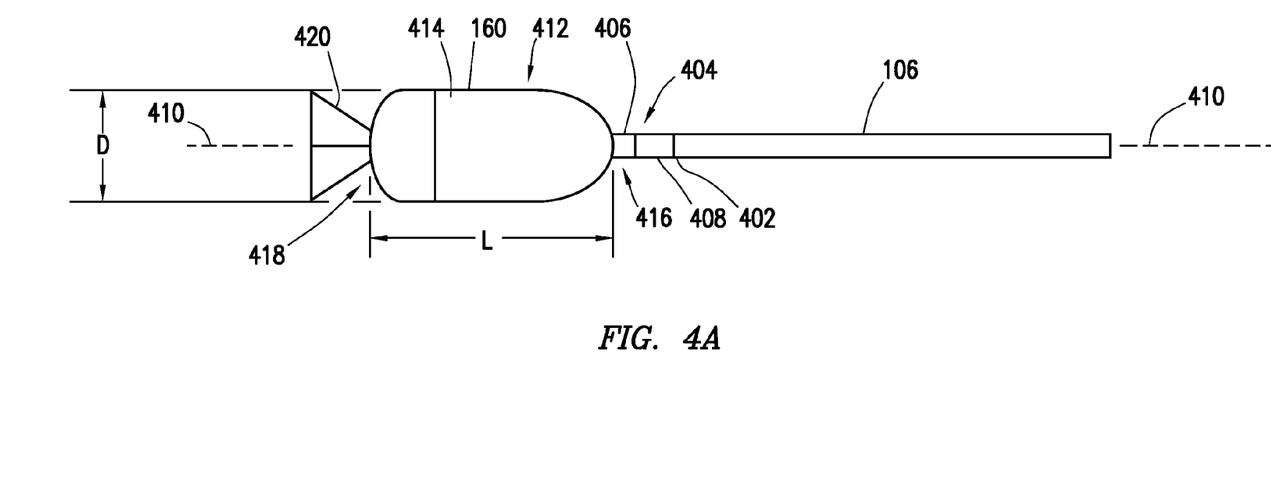
FIG. 4A is a side elevation view of a portion of a sensor streamer in further detail in accordance with at least some embodiments.

FIG. 4A shows a side elevation view of an embodiment of drag body 160 in further detail. Drag body 160 may be configured to mechanically couple to a distal end 402 of sensor streamer 106 using a connector 404. In some embodiments, connector 404 may comprise a fixed portion 406 coupled to a rotatable portion 408. The fixed portion 406 and rotatable portion 408 define a central axis 410 which may be coaxial with the central axis of sensor streamer 106 and the drag body 160. The fixed portion 406 may be rigidly coupled to the drag body 160, and the rotatable portion 408 may be coupled to the fixed portion in such a way that the connector 404 can swivel, enabling drag body 160 to rotate freely relative to sensor streamer 106. Connector 404 may include power, electrical and/or optical conductors to supply power and/or telemetry to drag body 160 from survey vessel 102 (either directly or indirectly via other survey equipment).

The drag body 160 may include an outer hull 412 that defines an exterior surface 414 In some embodiments, exterior surface 414 exhibits a circular diameter, a leading end 416, a length L, a diameter D, and a trailing end 418. In at least some cases, and as shown, the exterior surface defines a "torpedo" shape defining a rounded leading end 416 and tapered trailing end 418, but other shapes for the exterior surface 414 (e.g., spherical, cubical, conical etc.) may be equivalently used. In the example system, outer hull 412 has a length L greater than the diameter D. In some cases, the length L may be at least twice the diameter D. In one example system, the diameter may be on the order of about one meter, and the length may be on the order of about three meters, but again different diameters and lengths may be equivalently used. As would be understood by one of ordinary skill in the art with the benefit of this disclosure, the shape and dimensions of exterior surface 414 may be selected to meet the expected operational drag requirements. In some cases, the outer hull 412 may be constructed of a metallic material; however, depending on the operational depth of the marine geophysical survey, the outer hull 412 could be made of any suitable material (e.g., plastic, fiberglass).

FIG. 4A further shows an optional tail fin system 420 coupled to the trailing end 418 of the hull 412. The tail fin system 420 may enhance directional stability of the drag body 160 when in use.

Figure 4B:
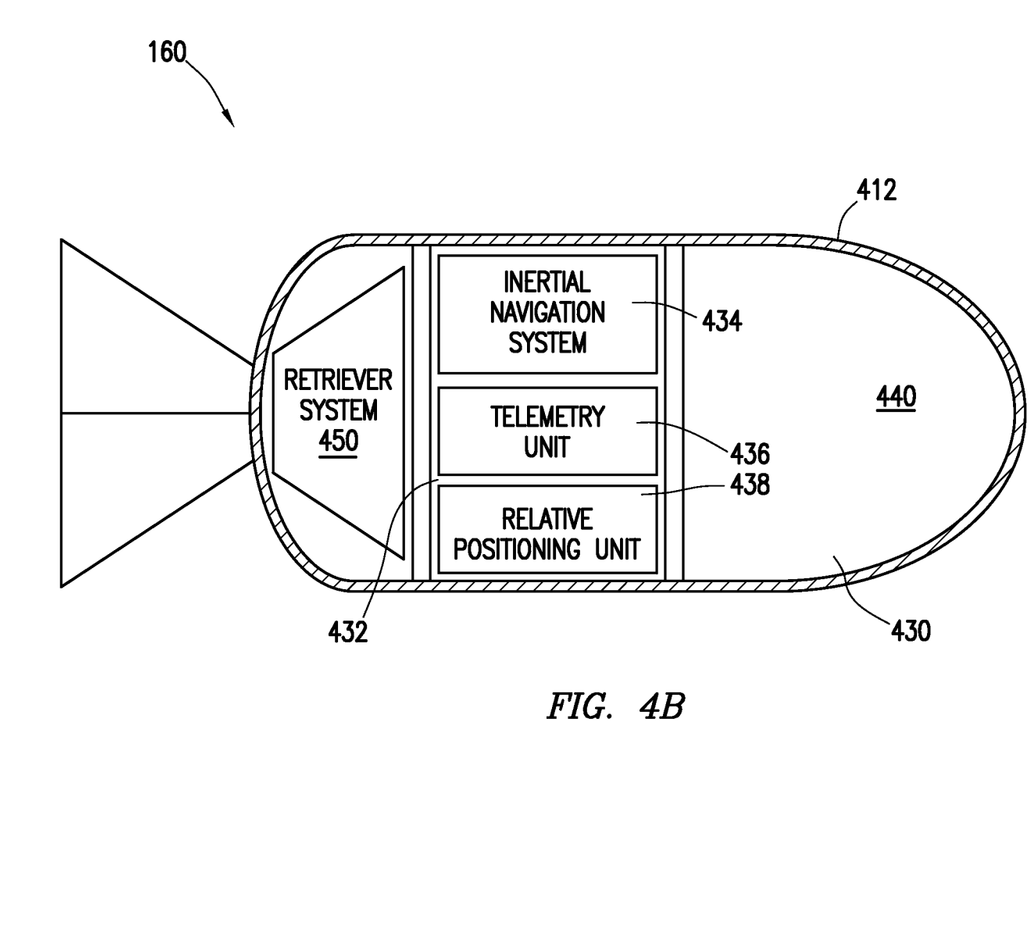
FIG. 4B is a cross section through the side elevation view of FIG. 4A.

FIG. 4B shows a side elevation, cross-sectional view, of the drag body 160 in accordance with at least some embodiments. In particular, the outer hull 412 defines an internal volume 430. Within the internal volume 430 may reside an electronics enclosure 432. The electronics enclosure 432 may define a sealed internal volume, and within which may reside various electronic components. For example, the drag body 160 may have an inertial navigation system 434 (shown in block diagram form, and discussed more below) disposed within the electronics enclosure 432. The drag body may also have a telemetry unit 436 and a relative positioning unit 438 disposed within the electronics enclosure 432. Other devices may also be disposed within the electronics enclosure (such as power controls), but are not shown so as not to unduly complicate the figure. While the electronics enclosure is shown disposed medially within the internal volume 430 of the outer hull 412, the electronics enclosure may be located at any suitable position.

Still referring to FIG. 4B, the drag body 160 may further define one or more internal chambers, such as chamber 440, designed to displace a predefined amount of water to make the drag body neutrally buoyant, or any other buoyancy selected for desired operational characteristics of the drag body 160 in relation to the sensor streamer (not shown in FIG. 4B). While in some cases the buoyancy of the drag body 160 may be adjusted at the surface prior to deployment (e.g., by partially filling chamber 440 with water), during normal use the operational buoyancy of the drag body 160 remains constant. Stated otherwise, in example systems the drag body 160 is not configured to rise or sink on command—the buoyancy while the drag body 160 is operationally deployed does not change by operation of devices within the drag body 160. It is noted that buoyancy may change based on external factors (e.g., depth, water temperature, salinity), but buoyancy changes based on external factors shall not be considered a change of the constant buoyancy of the drag body 160.

Finally with respect to FIG. 4B, the example drag body device 160 may further comprise a retriever system 450 at least partially disposed within the internal volume 430. In abnormal situations during a marine seismic survey a sensor streamer may become disconnected from the other survey equipment. Disconnection may be a mechanical failure associated with a sensor (e.g., at a lead-in connector), or disconnection may be caused by separation of the sensor streamer (e.g., cut by propeller of passing ship, shark bite). Once a sensor streamer and associated drag body 160 have become disconnected, the sensor streamer may become negatively buoyant and thus sink to the bottom, and possibly lost. To avoid loss of the drag body 160 and remaining portion of the sensor streamer, the retriever system 450 may monitor depth of the drag body 160. When depth of the drag body 160 passes a predetermined depth below any expected operational depth, the retriever system 450 may take action to make the drag body 160 positively buoyant. The action taken to make the drag body 160 positively buoyant may take many forms. For example, the retriever system may deploy a lifting bag system filled with gas to increase buoyancy of the drag body 160. The retriever system 450 may shed ballast weights coupled to the drag body 160 to increase buoyancy. As yet another example, the retriever system 450 may displace water within the chamber 440 (e.g., increasing internal pressure to force the water out of the chamber 440 through a check valve) to increase buoyancy of the drag body 160. The presence or use of the retriever system 450 as an emergency buoyancy system that activates to prevent loss the drag body, however, shall not be considered to affect the constant "operational buoyancy" of the drag body 160 during normal use.

The specification now turns to operational methods of the drag body 160 in accordance with example embodiments. In particular, the drag body 160 associated with each sensor streamer may be initially held on the deck of a deployment vessel (e.g., survey vessel 102). While on deck, the inertial navigation system 434 may be provided a very precise position indication, such as a position determined by a GPS device associated with and coupled to the vessel. The drag body 160 may then be deployed from the surface, and subsequently submerged to operational depth (e.g., 30 meters). In the example systems, the drag body 160 may stay submerged the entire time the sensor streamer is operationally deployed. That is, the drag body 160 may not be raised to the surface again during the entire marine geophysical survey (in a deep tow, for example, bringing the drag body to the surface is not practical). During periods of time when the drag body 160 is submerged, the inertial navigation system 434 periodically (e.g., every second) may determine a calculated position of the drag body 160, and may relay the calculated position to the survey vessel 102. However, inertial navigation systems experience positional errors or positional drift (sometimes referred to as integration drift), and the longer the inertial navigation system operates without receiving a highly accurate position indication from an external source, the greater the positional drift in the calculated position may become. Because a drag body 160 in accordance with some embodiments remains fully submerged while operationally deployed, a positioning system such as GPS internal to the drag body 160 may not be included. Thus, reducing positional drift of calculated position may be addressed in other ways, examples of which are discussed in greater detail below.

Figure 5:
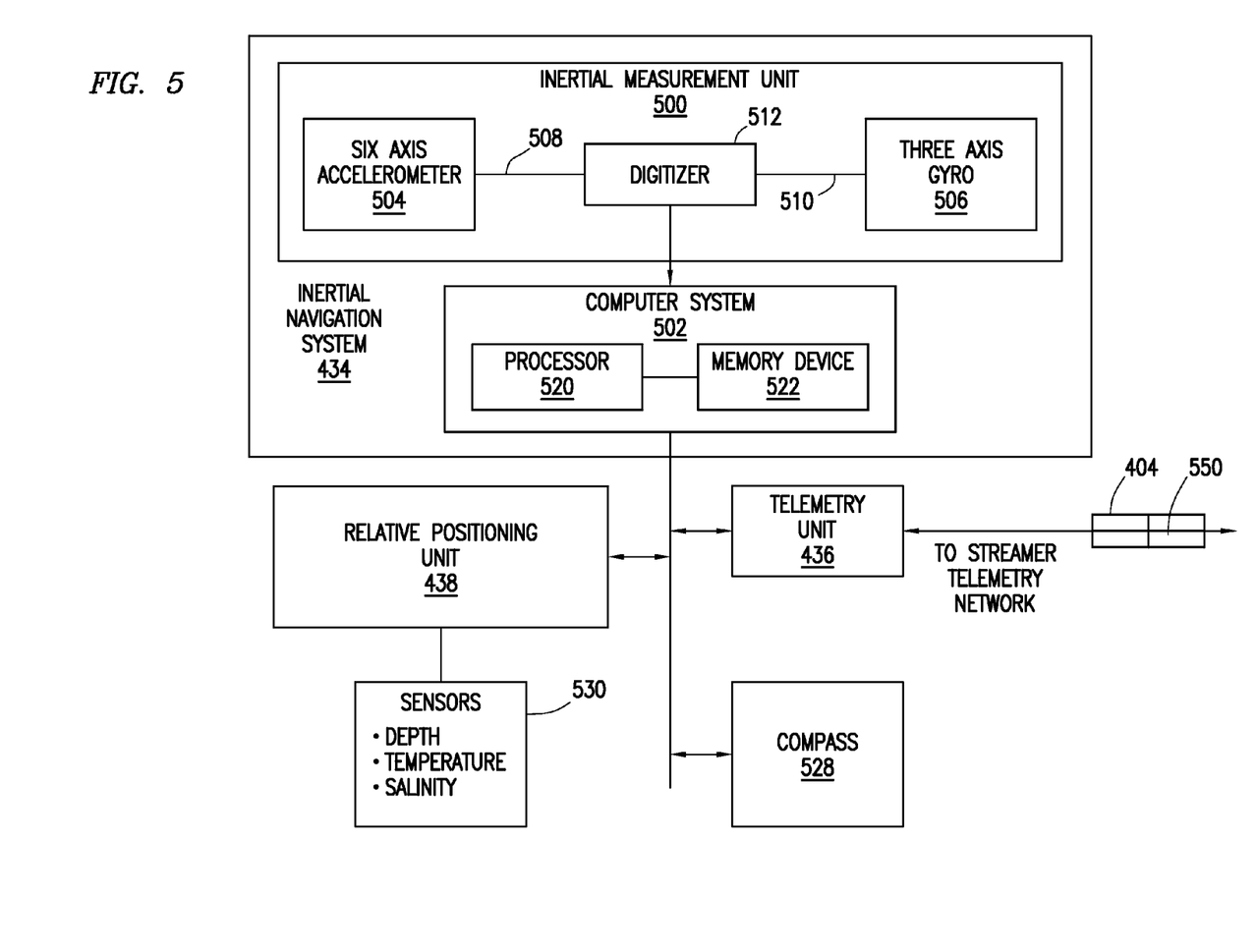
FIG. 5 is a block diagram of inertial navigation components which may be used in a drag body in accordance with at least some embodiments.

FIG. 5 shows, in block diagram form, various electrical and/or electromechanical devices that may be (at least partially) disposed within the electronics enclosure 432 defined within the drag body 160. In particular, FIG. 5 shows the example drag body 160 may comprise an inertial navigation system 434. Inertial navigation system 434 may comprise an inertial measurement unit 500 coupled to a computer system 502. Each will be discussed in turn. The inertial measurement unit 500 may comprise a six-axis accelerometer 504 and a three-axis gyroscope (gyro) 506. With the inertial measurement unit 500 disposed within the drag body 160, six-axis accelerometer 504 detects the accelerations of drag body 160 along three translational axes and about three rotational axes as the drag body moves in the sea. Three-axis gyro 506 detects the instantaneous rotational position of drag body 160 which may also be induced by its motion in the sea. Output signals 508 and 510 representing the values of the accelerations and rotational positions, respectively, may be input to a digitizer 512 to convert analog outputs to digital form which is provided to the computer system 502 to be further processed. In an embodiment, the data, in digital form may be communicated to computer system via an industry standard peripheral bus, such as a Universal Serial Bus (USB). Alternatively, any other suitable interface may be used.

In the embodiment of FIG. 5, six-axis accelerometer 504 and three-axis gyro 506 are depicted as integral components of the inertial measurement unit 500. Inertial measurement unit 500 may be a commercially available "off-the-shelf" device, such as a Honeywell HG9900 inertial measurement unit from Honeywell Aerospace of Phoenix, Arizona. However, in other cases, six-axis accelerometer 504 and three-axis gyro 506 may be provided separately. In such embodiments, the respective outputs may be digitized separately and separately communicated to processor 520, but the principles of the disclosure remain the same.

The computer system 502 may be coupled to the inertial measurement unit 500 and may take any suitable form. In example cases, the computer system comprise a processor 520 coupled to a memory device 522 (e.g., random access memory, read only memory, flash memory, and combinations thereof). Processor 520 may be implemented as an embedded central processing unit a single board computer, an application specific integrated circuit, a field programmable gate array, or the like. The memory device 522 may store programs that are executed by the processor 520 to perform the tasks associated with calculating position by the inertial navigation system 434.

Processor 520, executing programs stored on the memory device 522, may integrate the accelerations measured by accelerometer 504 to determine a position of drag body 160. Note that the position may include components due to the translational motion of the drag body through the sea and components due to the pitch, yaw and roll of the drag body in the sea. The rotational position data from three-axis gyro 506 may then be used by processor 520 to correct for the pitch, yaw and roll of drag body 160 and provide the calculated position data of the drag body based on an initial or starting position (assigned as discussed above). Processor 520 may then provide the calculated position data to telemetry unit 436 which may be connected to the streamer telemetry network (not shown in FIG. 5) for transmission to survey vessel 102.

Additionally, telemetry unit 436 may receive telemetry data transmitted to the drag body from the survey vessel. Data that might be sent to the drag body may include: the GPS position of the survey vessel during the marine seismic survey; speed of the vessel; calculated position data from other devices, such as other drag bodies within the marine seismic survey.

In yet another embodiment, computer system 502 may be omitted. In such an embodiment, the digitized data from digitizer 512 may be communicated directly to telemetry unit 436 for further communication on the streamer telemetry network to survey vessel 102. A computer system on board the survey vessel may then determine the position of the drag body from the raw data as described above. In such an embodiment, the electrical power that is provided to the drag body may be reduced. However, the amount of data that is communicated on the streamer telemetry network may be increased.

As discussed above, during periods of time when the drag body 160 is submerged, the inertial navigation system 434 periodically (e.g., every second) may determine a calculated position of the drag body 160, and may relay the calculated position to the survey vessel 102. However, inertial navigation systems experience positional drift, and the longer the inertial navigation system operates without a receiving a highly accurate position indication from an external source, the greater the positional drift in the calculated position may become. Because a drag body 160 in accordance with example systems remains fully submerged while operationally deployed, and because a GPS internal to the drag body 160 may not be included, positional drift of calculated position may be addressed in other ways. The specification now turns to example embodiments of reducing positional drift.

The various electronics at least partially disposed within the electronics enclosure may further include a relative positioning unit 438 in the form of an acoustic/optic positioning unit, a compass 528, and a various sensors 530 (e.g., depth sensor, temperature sensor, salinity sensor). These devices may be used to provide additional information with respect to the position and orientation of the drag body. Such additional information may be used to adjust the calculated position determined using the data from the inertial measurement unit 500 to at least in part, compensate for positional drift. Such compensation may be performed by processor 520 of the computer system 502, which may be coupled to relative positioning unit 438 and compass 528 to receive data indicative of position and orientation data therefrom. Various sensors 530 may be coupled to relative positioning unit 438 and may provide information on the depth of the drag body and the temperature and salinity of the sea water in the vicinity thereof to the relative positioning unit.

As previously described, a typical survey vessel may tow a plurality of sensor streamers. For example, in at least some embodiments from one up to about twenty-four sensor streamers may be towed. At least one of the sensor streamers may be equipped with a drag body 160 including an inertial navigating system in accordance with the principles disclosed herein. Each drag body may be attached to the distal end of its respective sensor streamer 106. Upon deployment of the sensor streamer 106, the operational length of sensor streamer 106 will be known to an operational tolerance. Assume, for the purpose of illustration, that the survey vessel is underway in a current-free water body. Then, the sensor streamers 106 will be arrayed parallel to the direction of travel directly behind the vessel, and for any given arrangement of the streamers transverse to the direction of travel, the spacing of the streamers, and thus the spacing of the drag bodies 160 is known. Consequently, any deviation of the distance between pairs of drag bodies from that based on the streamer spacing may be attributed to positional drifts in the inertial navigation systems. Thus, consider by way of example, and for ease of illustration, a tow along in a northerly direction. Because the sensor streamers are of fixed length and the drag bodies 160 are at the end of the streamer, a deviation in the calculated position of the drag body along a north-south line that corresponds to an apparent change in distance between the end of the streamer proximal to the vessel and the drag body may be attributed to positional drift of the inertial navigation system, and may be used to provide an estimate of the rate of drift of the guidance system and the reported positions of the respective drag bodies may be corrected thereby. Although the foregoing has been described in conjunction with a survey vessel traveling a linear course, similar considerations would be expected if the vessel were traveling on a circular or similar curved course.

If ocean currents are present, the sensor streamers may be deflected by the current and additional positioning mechanism may be used to estimate and correct for positional drift. To that end, acoustic positioning unit 438 may be configured to transmit and receive acoustic signals through the water. Further, streamers 106 may also be equipped with acoustic positioning units 142 distributed at locations along the length thereof, as described above. In particular, in at least some embodiments, the acoustic positioning units in streamers 106 may be located at predetermined intervals along the respective streamer. In some embodiments, acoustic positioning unit 438 may interrogate the acoustic positioning units in streamers 106. In at least some embodiments, a drag body 160 may interrogate a plurality of acoustic positioning units in a streamer 106, and, further, in at least some embodiments may interrogate a plurality of acoustic positioning units in a plurality of streamers 106. Each acoustic positioning unit may be interrogated, in turn via a communication signal addressed to the positioning unit being interrogated. The unit being interrogated may then return a response to the interrogating drag body 160.

Further, in at least some embodiments, an acoustic positioning unit 438 in a particular drag body 160 may interrogate the acoustic positioning units in the other drag bodies attached to respective ones of the plurality of streamers 106. Each such drag body 160 may be interrogated, in turn via a communication signal addressed, or otherwise directed, to the drag body being interrogated. The interrogated drag body may then transmit a response which may be received by the interrogating drag body 160. Using the elapsed time between the launching of the interrogation signal into the water and the receipt of the response, the acoustic positioning unit 438 may determine the distance between the interrogating drag body and the interrogated acoustic positioning unit deployed in a streamer 106 or drag body 160. The distance may be determined using the measured elapsed time and the velocity of sound in the surrounding sea water. In this respect, acoustic/optic positioning unit 518 may use the data received from sensors 530 to account for the effect of pressure, temperature and salt content on the velocity of sound in seawater. Further, while in the illustrated embodiment in FIG. 5 depicts the sensors 530 coupled to positioning unit 438, sensors 530 may, in at least some embodiments, be coupled to processor 520 and the compensation for the effects of pressure, temperature and salt content made by processor 520 on the position data received from positioning unit 438.

Regardless of whether the sensors 530 couple directly to the positioning unit 438 or to the processor 520, positioning unit 438 may provide data indicative of distance of a particular drag body with respect to each of the other drag bodies. Thus, each drag body may have an acoustically determined distance with respect to a plurality of positions along one or more streamers and with respect to one or more other drag bodies. These acoustically determined distances may be indicative of the relative positions of the drag body and the locations on the streamers, and the other drag bodies, as the case may be.

Each of the acoustically determined distances defines a circle with its center at the respective location of the corresponding acoustic positioning unit on a sensor streamer or relative positioning unit 438 on a drag body. The position of a particular drag body may be determined from such circles about the acoustic positioning units 142 or relative positioning unit 438 interrogated by that body. In particular, the position of the drag body must lie on each of such circles, and thus the position may be found from the intersections, or crossings, thereof. Because a pair of circles may intersect in two points, there may be ambiguities in the position of the particular drag body. By using the distances from a plurality of acoustic or relative positioning units and a plurality of sensor streamers, ambiguities may be resolved. Although the foregoing embodiment is described in terms of an acoustic positioning determination, other distance determination mechanisms may be used. For example, rather than acoustic sound an optical interrogation and response link may be employed, which may be used in at least some embodiments in accordance with the principles described in reference to the acoustic positioning unit.

The relative positions of the drag body may be used to correct for the positional drift of the inertial navigation system 434. For example, the positions of the drag body relative to the acoustic positioning unit locations on the sensor streamers or relative positioning unit locations on other drag bodies may not be expected to have a secular variation (i.e., one that is substantially monotonic increasing or decreasing). Thus, a secular variation of the relative position as determined by the inertial navigation system 434 may be attributed to positional drift of the inertial navigation system 434. The position of the drag body as determined by the inertial navigation system 434 may thus be corrected by adjusting for the positional drift. Additionally, by incorporating the relative positions from multiple locations and other drag bodies, errors in estimating the drift may be reduced by, for example averaging the individually estimated drifts.

Still referring to FIG. 5, additional information may be obtained from compass 528. As the drag body is towed through the water at the distal end of its sensor streamer, heading may deviate from the survey vessel heading because of currents deflecting the sensor streamer, and, further the heading may vary in time from yaw of the drag body at the connector 404. Compass 528 may provide heading data (corrected for declination) for the drag body which may be compared to the heading as determined from the data output from inertial measurement unit 500. Another estimate of the positional drift of inertial navigation system 434 may thereby be obtained, and in an embodiment, combined with the estimates determined from the relative position data as described above. Alternatively, in still other embodiments, the estimate of the positional drift obtained from the heading information may be independently used to correct for the positional drift of the inertial navigation system 434.

In yet still further embodiments, the speed and position of the survey vessel may be transmitted to the drag body via telemetry unit 436, for example, through a conductor 550 defined within the connector 404. Comparing the average speed of the drag body with the speed of the survey vessel, as may be received via telemetry unit 436, provides additional information with respect to the positional drift of the inertial navigation system 434. Further still, comparing the vessel position with the corrected drag body position provides information on the deflection of the sensor streamers from subsurface currents at the towing depth, which may be used in updating position corrections over the duration of the survey.

In yet still further embodiments, a drag body may communicate its calculated position to the other drag bodies via telemetry unit 436, for example. Telemetry unit 436 may send the current position of the drag body to survey vessel 102 which may then relay the information to the other drag bodies, or the streamer network may enable direct communication between the drag bodies. Each receiving drag body may then use its calculated position as determined by its inertial navigation system and the relative position data determined as described above to determine an estimated position of the other drag bodies. The receiving drag body may thereby realize a consistency check by comparing with the relayed positions of the other drag bodies, and the respective estimated positions.

Figure 6:
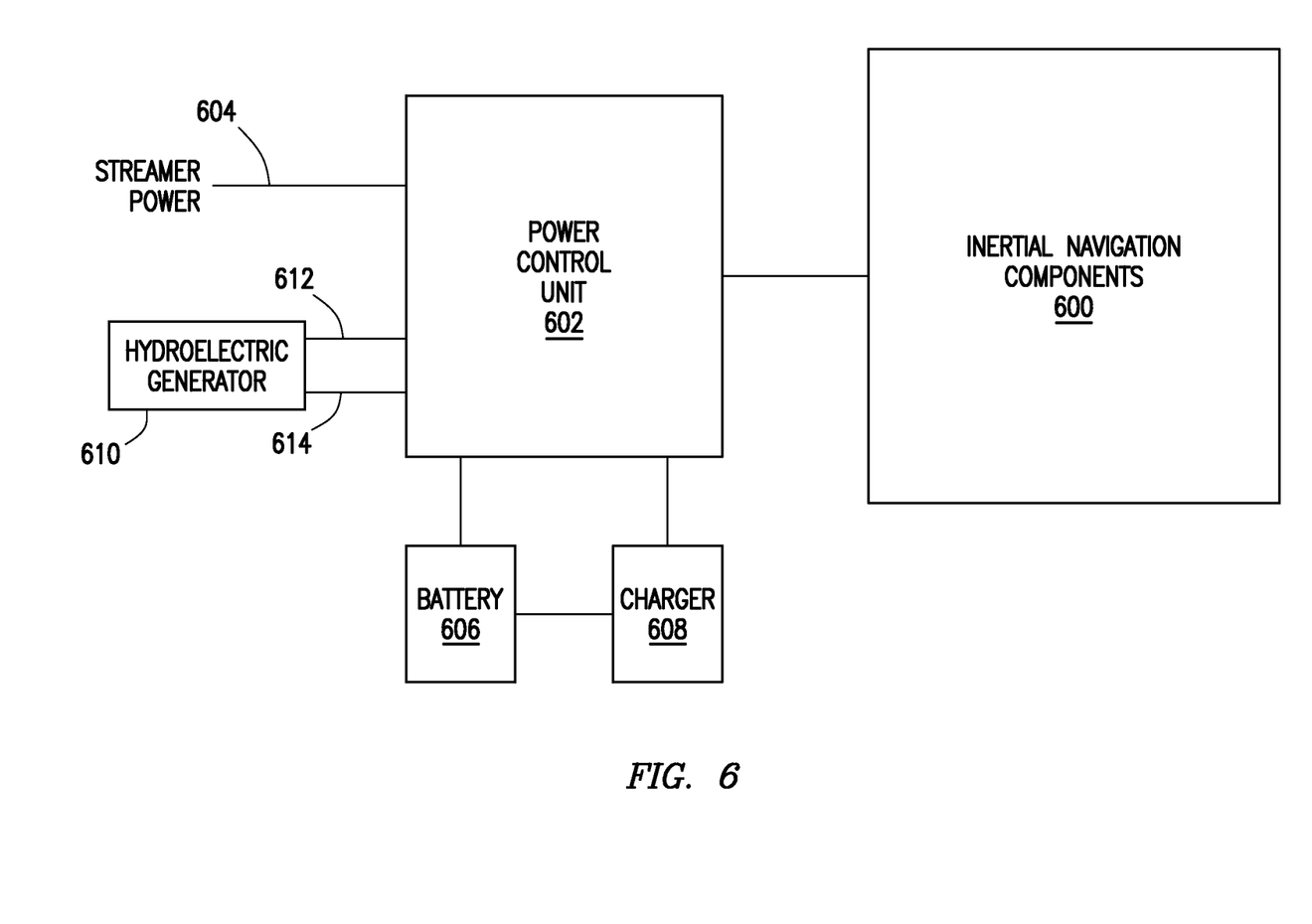
FIG. 6 is a block diagram of an inertial navigation system which may be used in a drag body in accordance with at least some embodiments.

FIG. 6 shows, in block diagram form, additional features of a drag body with an inertial navigation system in accordance with example embodiments. In particular, FIG. 6 shows inertial navigation components 600 (which may include the inertial navigation system 434, relative positioning unit 438, telemetry unit 436, various sensors 530, and compass 528). The inertial navigation components 600 couple to a power control unit 602 which provides power to inertial navigation components 600. Power control unit 602 may receive electrical power from several sources, including a battery 606, hydroelectric generator 610, and a connection 604 to the streamer power bus. Power control unit 602 may switch between the sources. Further, in the various embodiments, not all of these sources may be provided or otherwise available, and the power control unit may selectively switch between power sources based on detecting their presence or availability. Thus for example, if streamer power is not provided, or fails, power control unit 602 may switch between battery 606 and hydroelectric generator 610, which may have a control line 612, discussed further below, coupled to power control unit 602 along with power connection 614. The selection of either battery 606 or hydroelectric generator 610 may be made in accordance with a predetermined priority. In at least some embodiments, battery power may take priority over hydroelectric generation, for example, to avoid the additional drag that will accompany the generation of electrical power by generator 610 which proceeds by the turning of the generator shaft by water flowing through a propeller attached to the shaft. Additionally, power control unit 602 may monitor the state of the battery 606, and supply electrical power to battery charger 608 to recharge the battery. If streamer power is available, power control 602 may provide streamer power to battery charger 608. Otherwise, power control 602 may provide power to charger 608 via hydroelectric generator 610. In at least some embodiments, when hydroelectric generator 610 is not in use, power control unit 602 may send a control signal, via control line 612, to the generator to feather the propeller to further reduce drag.

Figure 7A:
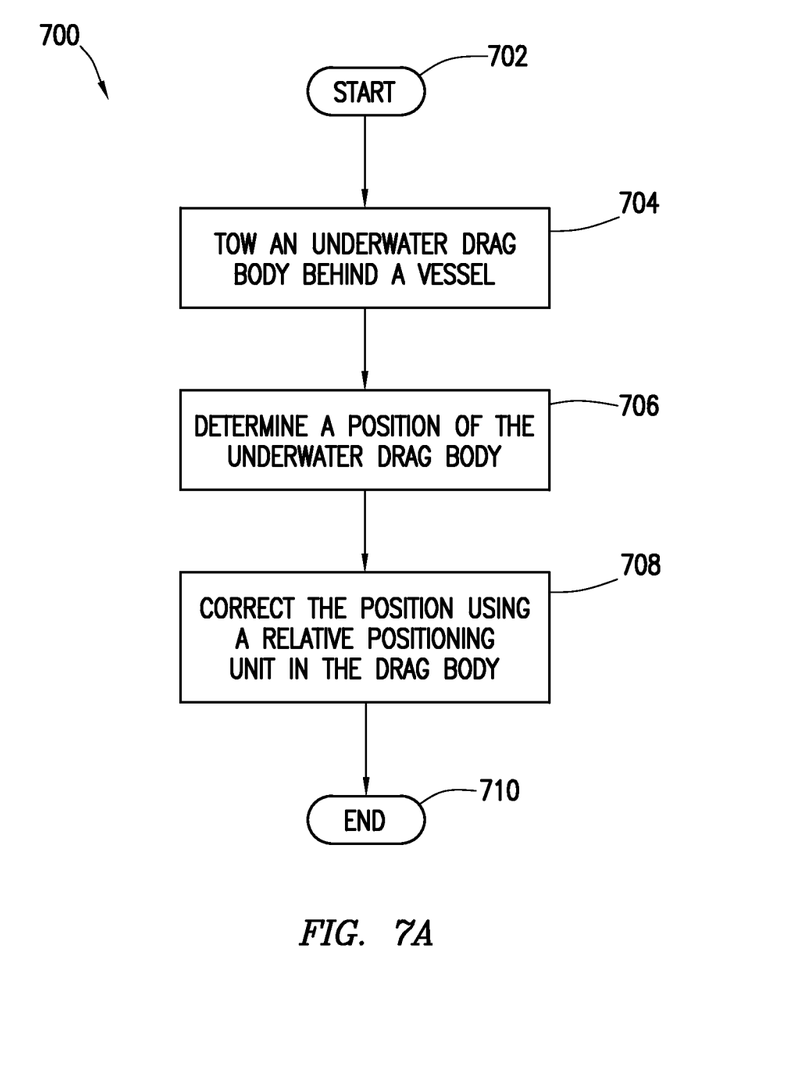
FIG. 7A is a flow chart of a method in accordance with at least some embodiments.
Figure 7B:
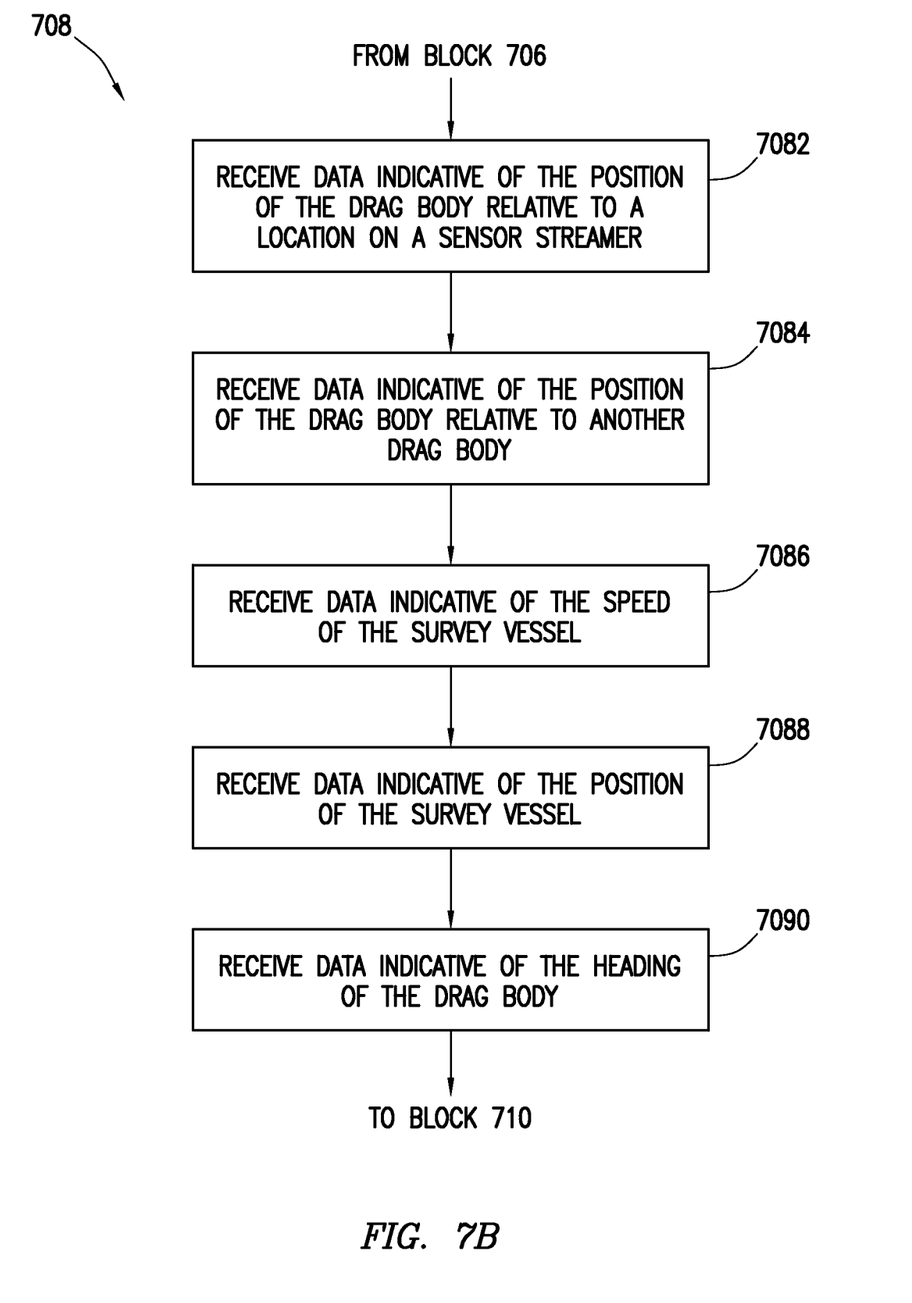
FIG. 7B is a flow chart, in further detail, of a portion of the method in FIG. 7A.

Refer now to FIGS. 7A and 7B illustrating a flow chart of a method 700 to of determining a position of a towed drag body in accordance with the principles described above. In FIG. 7A, method 700 starts in block 702. In block 704, the drag body is towed behind a survey vessel. A calculated position of the drag body is determined in block 706, for example from the data output from inertial measurement unit 500. In block 708, the position is corrected, using a relative positioning unit in the drag body providing a relative position of the drag body. Inasmuch as, in various embodiments, the correction of position takes place without using a GPS associated with the drag body, the correction takes place while the drag body is fully submerged.

FIG. 7B illustrates block 708 in further detail. Data indicative of the position of the drag body relative to a location on a sensor streamer is received, block 7082. In block 7084, data indicative of the position of the drag body relative to another drag body is received. In at least some embodiments, the data may be received in blocks 7082 or 7084 in response to an interrogation by the relative position unit in the drag body as described in conjunction with FIG. 5. In blocks 7086 and 7088, respectively, data indicative of the speed and position of the survey vessel are received. The aforementioned data may, in at least some embodiments, be received via telemetry unit 436. Data indicative of the heading of the drag body is received in block 7090, and block 708 proceeds to block 710.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

It is noted that while theoretically possible to perform some or all the calculations and analysis by a human using only pencil and paper, the time measurements for human-based performance of such tasks may range from man-days to man-years, if not more. Thus, this paragraph shall serve as support for any claim limitation now existing, or later added, setting forth that the period of time to perform any task described herein less than the time required to perform the task by hand, less than half the time to perform the task by hand, and less than one quarter of the time to perform the task by hand, where "by hand" shall refer to performing the work using exclusively pencil and paper.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a computer-readable media that stores a software program to implement the method aspects of the various embodiments.

References to "one embodiment", "an embodiment", "a particular embodiment", "example embodiments", "some embodiments", and the like, indicate that a particular element or characteristic is included in at least one embodiment of the invention. Although the phrases "in one embodiment", "an embodiment", "a particular embodiment", "example embodiments, "some embodiments", and the like, may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A drag body comprising:
   an inertial measurement unit configured to generate:
   a determination of linear acceleration of the drag body, and
   a determination of angular acceleration of the drag body;
   a computer system comprising a processor and a memory device; and
   a connector configured to communicatively couple the drag body to a sensor streamer of a marine geophysical survey;
   wherein operational buoyancy of the drag body is constant,
   and wherein the processor:
   determines a calculated position of the drag body relative to a starting position, the determination of position made without using a GPS position of the drag body; and
   corrects the calculated position based on at least one of either:
   data indicative of position of a survey vessel;
   data indicative of relative position of the drag body with respect to at least one other device; or
   data indicative of a calculated position of another drag body.

2. The drag body of claim 1 further comprising:
   a hull that defines an exterior surface and an internal volume;
   an electronics enclosure defined within the internal volume; and wherein the connector further comprises:
   a fixed portion rigidly coupled to the hull
   a rotatable portion coupled to the fixed portion and configured to be coupled to the sensor streamer;
   the fixed portion and rotatable portion defining a central axis, and the rotatable portion rotatable about the central axis relative to the fixed portion; wherein
   the connector defines a conductor communicatively coupled to the to the computer system regardless of the rotational relationship of the fixed portion and rotatable portion; and
   wherein the computer system is disposed within the internal volume.

3. The drag body of claim 2 wherein the conductor is at least one selected from the group consisting of: a fiber optic conductor; and an electrical conductor.

4. The drag body of claim 2 further comprising:
   an acoustic positioning unit at least partially disposed within the electronics enclosure, and communicatively coupled to the computer system;
   wherein the program on the memory device, when executed by the processor, further causes the processor to receive, from the acoustic positioning unit, data indicative of relative position of the drag body with respect to at least one other device; and wherein
   the calculated position of the drag body is corrected based on the data indicative of relative position of the drag body to the at least one other device.

5. The drag body of claim 4 wherein the at least one other device is at least one selected from the group consisting of: a sensor streamer; and another drag body.

6. The drag body of claim 4 further comprising:
   a depth sensor configured to determine depth of water, the depth sensor coupled to the acoustic positioning unit;
   a salinity sensor configured to determine salinity of water surrounding the hull, the salinity sensor coupled to the acoustic positioning unit;
   a temperature sensor configured to determine temperature of water surrounding the hull, the temperature sensor coupled to the acoustic positioning unit;
   wherein the acoustic positioning unit is configured to consider salinity of the water and temperature of the water as part of the calculation of data indicative of relative position of the drag body.

7. The drag body of claim 2 further comprising:
an acoustic positioning unit at least partially disposed within the electronics enclosure, and communicatively coupled to the computer system;
a depth sensor configured to determine depth of water, the depth sensor coupled to the acoustic positioning unit;
a salinity sensor configured to determine salinity of water surrounding the hull, the salinity sensor coupled to the acoustic positioning unit;
a temperature sensor configured to determine temperature of water surrounding the hull, the temperature sensor coupled to the acoustic positioning unit;
wherein the acoustic positioning unit is configured to consider depth, salinity of the water, and temperature of the water as part of the calculation of data indicative of relative position of the drag body;
wherein the memory device stores a program that, when executed by the processor, causes the processor to:
receive data indicative of the starting position of the drag body;
receive across the conductor data indicative of position of a survey vessel;
read linear acceleration from the inertial measurement unit;
read angular acceleration from the inertial measurement unit;
determine a calculated position of the drag body relative to a starting position, the determination of position made without using a GPS position of the drag body;
correct the calculated position of the drag body based on the data indicative of position of the survey vessel;
receive across the conductor data indicative of calculated position of another drag body within a marine geophysical survey;
correct the calculated position of the drag body based on the data indicative of calculated position of another drag body;
receive, from the acoustic positioning unit, data indicative of relative position of the drag body with respect to at least one other device; and
correct the calculated position of the drag body based on the data indicative of relative position.

8. The drag body of claim 2 further comprising a tail fin defined on the trailing edge of the hull opposite the connector.

9. The drag body of claim 1 wherein the program on the memory device, when executed by the processor, further causes the processor to receive across the conductor data indicative of position of the survey vessel, and wherein the calculated position of the drag body is corrected based on the data indicative of position of the survey vessel.

10. The drag body of claim 1 wherein the program on the memory device, when executed by the processor, further causes the processor to receive data indicative of the starting position of the drag body.

11. The drag body of claim 1 wherein the program on the memory device, when executed by the processor, further causes the processor to read across the conductor data indicative of calculated position of another drag body within a marine geophysical survey, and wherein the calculated position of the drag body is corrected based on the data indicative of calculated position of another drag body.

12. A method comprising:
towing a drag body attached to a sensor streamer through water behind a survey vessel, the sensor streamer operationally deployed in a marine geophysical survey;
determining a calculated position of the drag body using an inertial navigation system located in the drag body, the inertial navigation system configured to generate:
a determination of linear acceleration of the drag body, and
a determination of angular acceleration of the drag body, and wherein the calculated position has positional drift;
determining a relative position of the drag body with respect to another device within the marine geophysical survey, the determining by way of a relative positioning unit located in the drag body; and
correcting the calculated position using the relative position of the drag body, the correcting while the drag body is fully submerged.

13. The method of claim 12 wherein correcting the calculated position further comprises:
sending position of the survey vessel to the inertial navigation system in the drag body, the sending across a communicative conductor of the sensor streamer; and
correcting the calculated position using the position of the survey vessel.

14. The method of claim 12 wherein the correcting calculated position comprises:
receiving data indicative of the speed of the survey vessel; and
correcting the calculated position using data indicative of speed of the survey vessel.

15. The method of claim 12 wherein the relative positioning unit comprises an acoustic positioning unit.

16. The method of claim 12 wherein determining the relative position further comprises determining the relative position of the drag body with respect to at least one of a sensor streamer in the plurality of sensor streamers and another drag body.

17. The method of claim 16 wherein determining the relative position further comprises receiving, from at least one of a sensor streamer and another drag body, data indicative of a relative position of at the least one of a sensor streamer and another drag body, the receiving in response to an interrogation of the at least one of a sensor streamer and another drag body by the relative positioning unit.

18. The method of claim 12 further comprising supplying a starting position of the drag body as the position of the vessel when the drag body in on the vessel.

19. A marine survey method comprising:
towing a sensor streamer operationally deployed in a marine geophysical survey through a water body water behind a survey vessel, the sensor streamer having:
a plurality of sensors configured to detect energy emitted by a source and subjected to interactions with an underground formation beneath a bottom of the body of water; and
a drag body coupled to a distal end of the sensor streamer and configured to provide a drag to maintain an orientation of the sensor streamer, the drag body further configured to determine a position of the distal end of the sensor streamer by:
determining a calculated position of the drag body using an inertial navigation system located in the drag body, wherein the inertial navigation system is configured to generate a determination of linear acceleration of the drag body, and a determination of the angular acceleration of the drag body, the calculated position having positional drift;

determining a relative position of the drag body with respect to another device within the marine geophysical survey, the determining by way of a relative positioning unit located in the drag body; and correcting the calculated position using the relative position of the drag body, the correcting while the drag body is fully submerged.

20. A drag body comprising:

an inertial measurement unit configured to generate:

a determination of linear acceleration of the drag body, and a determination of angular acceleration of the drag body;

a computer system comprising a processor and a memory device; and a connector configured to communicatively couple the drag body to a sensor streamer of a marine geophysical survey;

wherein operational buoyancy of the drag body is constant, and wherein the processor:

determines a calculated position of the drag body relative to a starting position, the determination of position made without using a GPS position of the drag body; and corrects the calculated position based on data indicative of position of a survey vessel.

21. A drag body comprising:

an inertial measurement unit configured to generate:

a determination of linear acceleration of the drag body, and a determination of angular acceleration of the drag body;

a computer system comprising a processor and a memory device; and a connector configured to communicatively couple the drag body to a sensor streamer of a marine geophysical survey;

wherein operational buoyancy of the drag body is constant, and wherein the processor:

determines a calculated position of the drag body relative to a starting position, the determination of position made without using a GPS position of the drag body; and corrects the calculated position based on data indicative of relative position of the drag body with respect to at least one other device.

22. A drag body comprising:

an inertial measurement unit configured to generate:

a determination of linear acceleration of the drag body, and a determination of angular acceleration of the drag body;

a computer system comprising a processor and a memory device; and a connector configured to communicatively couple the drag body to a sensor streamer of a marine geophysical survey;

wherein operational buoyancy of the drag body is constant, and wherein the processor:

determines a calculated position of the drag body relative to a starting position, the determination of position made without using a GPS position of the drag body; and corrects the calculated position based on data indicative of a calculated position of another drag body.

* * * * *